(12) United States Patent
Krüger et al.

(10) Patent No.: US 6,240,843 B1
(45) Date of Patent: Jun. 5, 2001

(54) SHEET TRANSPORT SYSTEM FOR A ROTARY PRINTING PRESS

(75) Inventors: Michael Krüger, Edingen-Neckarhausen; Hans-Jörg Laubscher, Frankenthal, both of (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/201,726

(22) Filed: Nov. 30, 1998

Related U.S. Application Data (63) Continuation of application No. PCT/EP97/02750, filed on May 28, 1997.

(30) Foreign Application Priority Data

May 29, 1996 (DE) .............................................. 196 21 507

(51) Int. Cl.[7] .................................................... B41F 13/24
(52) U.S. Cl. ........................ 101/232; 101/183; 271/193; 310/13; 318/38
(58) Field of Search ..................................... 101/181, 183, 101/232; 271/193, 204; 310/12–14; 318/38, 135

(56) References Cited

U.S. PATENT DOCUMENTS

| | | | |
|---|---|---|---|
| 4,081,723 | * | 3/1978 | Vetter et al. ......................... 101/181 |
| 4,669,715 | | 6/1987 | Jeschke . |
| 4,906,878 | * | 3/1990 | Twaalfhoven et al. ................ 310/12 |
| 5,047,676 | * | 9/1991 | Ichikawa ............................... 310/12 |
| 5,181,715 | * | 1/1993 | Ohkoda et al. ...................... 271/272 |
| 5,320,039 | * | 6/1994 | Reponty et al. ..................... 101/228 |

FOREIGN PATENT DOCUMENTS 25 01 963 A1   12/1975   (DE) .

* cited by examiner

Primary Examiner—Ren Yan
(74) Attorney, Agent, or Firm—Herbert L. Lerner; Laurence A. Greenberg; Werner H. Stemer (57) ABSTRACT

A sheet transport system for a rotary printing press, including a sheet transport device having a sheet holder, and a first and a second propulsive drive element for propulsively driving the sheet transport device guidingly in a first and a second guide rail, respectively, the second guide rail extending substantially parallel to the first guide rail, the first and the second propulsive drive elements forming rotors of an electric linear drive, the first and the second guide rails having a plurality of drive stations disposed thereon and forming a stator of the linear drive, and a control device assigned to the drive stations for controlling and regulating movement of the first and the second propulsive drive elements, each of the first and second propulsive drive elements being a structure formed of magnetizable material, at least part of which is movable relative to another part thereof, and the drive stations being spaced from one another, at least in some sections of the sheet transport device, a distance which is at most equal to the length of the propulsive drive elements; and a propulsive drive device, a web infeed device and a transport gripper system.

25 Claims, 6 Drawing Sheets

SHEET TRANSPORT SYSTEM FOR A ROTARY PRINTING PRESS

CROSS-REFERENCE TO RELATED APPLICATION

This is a continuation of copending International Application PCT/EP97/02750, filed May 28, 1997, which designated the United States.

BACKGROUND OF THE INVENTION

Field of the Invention

The invention relates to a sheet transport system, a propulsive drive device, a web infeed device and a transport gripper system for a rotary printing machine including a sheet transport device having a sheet holder, and a first and a second propulsive drive element for propulsively driving the sheet transport device guidingly in a first and a second guide rail, respectively, the second guide rail extending substantially parallel to the first guide rail, the first and the second propulsive drive elements forming rotors of an electric linear drive, the first and the second guide rails having a plurality of drive stations disposed thereon and forming a stator of the linear drive, and a control device assigned to the drive stations for controlling and regulating movement of the first and the second propulsive drive elements. Sheet transport systems for rotary printing presses have become known heretofore in the prior art and are installed or used, for example, in the feeder region of a printing press to remove a sheet from a sheet pile and to feed the sheet to a first printing unit. Furthermore, it has become known heretofore to use sheet transport systems for transporting sheets within the printing press from printing unit to printing unit or for transporting the sheets from the last printing unit to a delivery pile in a delivery region, the transport of the sheets in the different printing press sections being generally performed by variously constructed sheet transport systems. Thus, in the feeder region, mechanically driven, mainly rectilinearly displaced suction devices in the form of lifting and dragging suckers are used. Between the printing units, i.e., within the printing press, the sheet transport is then usually performed by sheet transfer cylinders or drums with gripper devices arranged thereon. In the delivery region, the sheets are finally transported by gripper bars, which are fixed to two revolving endless chains arranged parallel to one another.

Furthermore, the German Non-prosecuted Patent Application (DE-OS) 25 01 963 discloses the practice of transporting the sheets through the entire printing press with the aid of a sheet transport system in the form of a gripper carriage with a gripper bar arranged thereon. The gripper carriage is driven, in this regard, by first and second propulsive or forward drive elements, which are guided in appertaining endless guide rails running at both sides in the housing of the printing press, and form the rotor of an electric linear motor. Extending along the two guide rails are endless stator coils, which produce an electromagnetic traveling field for the propulsive drive of the gripper carriage. In this regard, provision may be made for the coils to be subdivided into a plurality of electrically independent subsections, which are assigned to the respective printing units, in order to be able to control the speed of the gripper carriage with high accuracy, for example, when it is passing a press nip. A disadvantage of the aforedescribed sheet transport system is that the stator coils are constructed as endless coils, which leads to a high electrical power demand and makes necessary a comparatively high control and regulation outlay and the corresponding costs associated therewith. Thus, particularly in order to achieve the in-register feeding of sheets into the press nips of the respective printing units, it is necessary to drive each individual winding of the endless coil by a separate control device, in order to attain the required accuracy.

SUMMARY OF THE INVENTION

It is accordingly an object of the invention to provide a sheet transport system for rotary printing presses which may be installed universally in the individual subsections of a printing press, and has a movement which takes place with an accuracy required for the in-register sheet transport in a printing press and which requires, in addition to a reduced outlay or expense for devices for controlling and regulating the propulsive drive movement, a comparatively low electrical power demand.

With the foregoing and other objects in view, there is provided, in accordance with a first aspect of the invention, a sheet transport system for a rotary printing press, including a sheet transport device having a sheet holder, and a first and a second propulsive drive element for propulsively driving the sheet transport device guidingly in a first and a second guide rail, respectively, the second guide rail extending substantially parallel to the first guide rail, the first and the second propulsive drive elements forming rotors of an electric linear drive, the first and the second guide rails having a plurality of drive stations disposed thereon and forming a stator of the linear drive, and a control device assigned to the drive stations for controlling and regulating movement of the first and the second propulsive drive elements, each of the first and second propulsive drive elements comprising a structure formed of magnetizable material, at least part of which is movable relative to another part thereof, and the drive stations being spaced from one another, at least in some sections of the sheet transport device, a distance which is at most equal to the length of the propulsive drive elements.

In accordance with another feature of the invention, the structure of the propulsive drive elements, respectively, is a link chain formed of the magnetizable material and including at least two individual elements articulatedly connected to one another.

In accordance with a further feature of the invention, the structure of the propulsive drive elements, respectively, is a flexible belt formed of the magnetizable material.

In accordance with an added feature of the invention, the magnetizable material is formed by permanent magnets.

In accordance with an alternative feature of the invention, the magnetizable material contains permanent magnets.

In accordance with an additional feature of the invention, the magnetizable material is a ferromagnetic material.

In accordance with yet another feature of the invention, the flexible belt is formed at least partly with ferromagnetic material, and slots are provided in the belt.

In accordance with yet an added feature of the invention, the sheet transport system is in combination with a printing press, and the sheet transport device is arranged between an upline and a downline printing unit of the printing press, and the sheet holder is formed by gripper devices for accepting a sheet from gripper devices of the upline printing unit and transferring the sheet to gripper devices of the downline printing unit.

In accordance with yet a further feature of the invention, the sheet transport system includes a plurality of sheet transport devices simultaneously revolvable together within the guide rails.

In accordance with yet an additional feature of the invention, the sheet transport device is arranged in a delivery region of a printing press, and the sheet holder is formed by gripper devices for accepting a sheet from an upstream printing unit of the printing press and depositing the sheet on a pile.

In accordance with still another feature of the invention, the control device serves for controlling the movement of the propulsive drive elements of the sheet transport devices in the region of the sheet pile so that distances between two successive sheet transport devices are less than the length of a transported sheet, and so that an imbricated formation of the deposited sheets is formed.

In accordance with still a further feature of the invention, the sheet transport system includes at least one dryer disposed in vicinity of the guide rails, so that the printed sheets are guidable past the dryer.

In accordance with still an added feature of the invention, the first and second guide rails, in the region of the at least one dryer, are divided into two rail paths running above one another wherein the speed of the sheet transport devices is reduced, and a diverter is provided thereat for feeding successive sheet transport devices alternately to the two rail paths.

In accordance with still an additional feature of the invention, the rail paths extend substantially horizontally at a spaced distance from one another, and a respective one of the dryers is arranged above and below each of the rail paths so that the upper side and the underside of each sheet can be dried simultaneously.

In accordance with another feature of the invention, the sheet transport system includes a cross member extending from the first propulsive drive element to the second propulsive drive element, the sheet holder being formed by gripper devices fixed to the cross member.

In accordance with a further feature of the invention, the cross member is connected articulatedly to the first and the second propulsive drive elements.

In accordance with an added feature of the invention, the sheet transport device is arranged in a feeder region of a printing press, and the sheet holder of the sheet transport device is formed by suction devices for removing from a sheet pile the sheets to be transported, and for feeding the sheets to a first printing unit of the printing press.

In accordance with an additional feature of the invention, the control device is actuatable for changing the speed of the first and the second propulsive drive elements during one revolution of the sheet transport device so that the speed of the sheet transport device is reduced when a sheet is being removed by suction from the sheet stack, and is subsequently increased to a predefined value.

In accordance with yet another feature of the invention, after the sheet has been picked up by suction and before the sheet has been released, the speed of the sheet transport device is increasable to a speed which corresponds substantially to the speed of an imbricated formation formed by the sheets.

In accordance with yet a further feature of the invention, the suction devices are fixed to a cross member extending from the first propulsive drive element to the second propulsive drive element.

In accordance with yet an added feature of the invention, the control device is actuatable for controlling and regulating the movement of the first and second propulsive drive elements independently of one another, and for changing the relative position between the first propulsive drive element and the second propulsive drive element, in order to adjust the oblique register of a transported sheet.

In accordance with a second aspect of the invention, there is provided a propulsive drive device for a transport system in a rotary printing press, having at least one guide rail and a propulsive drive element guidable in the guide rail and forming a rotor of an electric linear drive, drive stations arranged outside the guide rail and containing electric coils, the drive stations forming a stator of the electric linear drive, and a control device assigned to the drive stations for controlling and regulating movement of the propulsive drive elements, the propulsive drive element comprising a structure formed of magnetizable material, at least part of which is movable relative to another part thereof, and the drive stations being spaced from one another, at least in some sections of the sheet transport device, a distance which is at most equal to the length of the propulsive drive elements.

In accordance with another feature of the invention, the propulsive drive element is formed by a link chain respectively having at least two individual elements formed of the magnetizable material and articulatedly connected to one another.

In accordance with a further feature of the invention, the propulsive drive element is formed by a flexible belt of the magnetizable material having slots provided therein.

In accordance with a third aspect of the invention, there is provided a propulsive drive device for a transport system in a rotary printing press, having at least one guide rail and a propulsive drive element guidable in the guide rail and forming a rotor of an electric linear drive, drive stations arranged outside the guide rail and containing electric coils, the drive stations forming a stator of the electric linear drive, and a control device assigned to the drive stations for controlling and regulating movement of the propulsive drive element, the propulsive drive element comprising a link chain respectively including at least two individual elements articulatedly connected to one another and constructed as closed electric conductor loops, and the drive stations being spaced from one another, at least in some sections of the sheet transport device, a distance which is at most equal to the length of the propulsive drive elements.

In accordance with a fourth aspect of the invention, there is provided a web infeed device for a web-fed rotary printing press, comprising a propulsive drive device.

In accordance with a fifth aspect of the invention, there is provided a transport gripper system in a further processing device for printed products, comprising a propulsive drive device.

In accordance with a concomitant feature of the invention, the distance between two drive stations over a subsection of the guide rails is greater than the length of the propulsive drive elements to such an extent that the movement of the propulsive drive elements in this subsection occurs substantially without any drive, and solely by virtue of movement energy of the propulsive drive elements which has been fed to the propulsive drive elements in an upline drive station.

Thus, according to a first embodiment of the invention, a sheet transport system for a rotary printing machine comprises a sheet transport device which has a sheet holder, the sheet transport device being propulsively driven by a first propulsive drive element guidable in a first guide rail and by a second propulsive drive element guidable in a second guide rail extending substantially parallel to the first guide rail, the first and second propulsive drive elements forming rotors of an electric linear drive, and being formed by link chains made of magnetizable material, preferably permanent magnetic material, each of the drive elements, respectively, being formed of at least two individual elements articulatedly connected to one another.

According to a first embodiment of the invention, provided on the first and second guide rails are a plurality of drive stations forming the stator of the linear drive and spaced a distance from one another which is, in substance, less than or equal to the length of the propulsive drive elements, movement of the first and second forward drive elements being controlled and regulated by a control device assigned to the drive stations.

Instead of the individual elements made of magnetizable material, in another embodiment of the propulsive drive element, provision may likewise be made to replace the individual elements of the link chains by closed conductor loops and, in this case, to construct the linear drive as a conventional asynchronous drive.

In a further embodiment, provision may be made in the same manner for the propulsive drive element to be formed by a flexible belt of magnetizable material, which is provided with slots, the linear drive in this case operating in accordance with the reluctance principle.

A propulsive drive device in accordance with the invention, which is formed by at least one propulsive drive element and one guide rail and appertaining drive stations, is preferably used as a pulling device or as the drive for a conventional web infeed device in a web-fed rotary printing press.

In a similar manner, it is possible to use the propulsive drive device according to the invention as a transport gripper system or as a drive for a conventional transport gripper system for printed products, such as is used, for example, in further processing devices such as binders, and so forth, in order to transport the finished printed products.

According to a further embodiment of the invention, the distance between two drive stations over one or more subsections of the guide rails is greater than the length of the propulsive drive elements, so that the movement of the propulsive drive elements in this subsection takes place essentially without any drive, and solely by virtue of the movement energy of the propulsive drive element or elements.

Other features which are considered as characteristic for the invention are set forth in the appended claims.

Although the invention is illustrated and described herein as embodied in a sheet transport system for a rotary printing press, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

DESCRIPTION OF THE PREFERRED EMBODIMENTS

Figure 1:
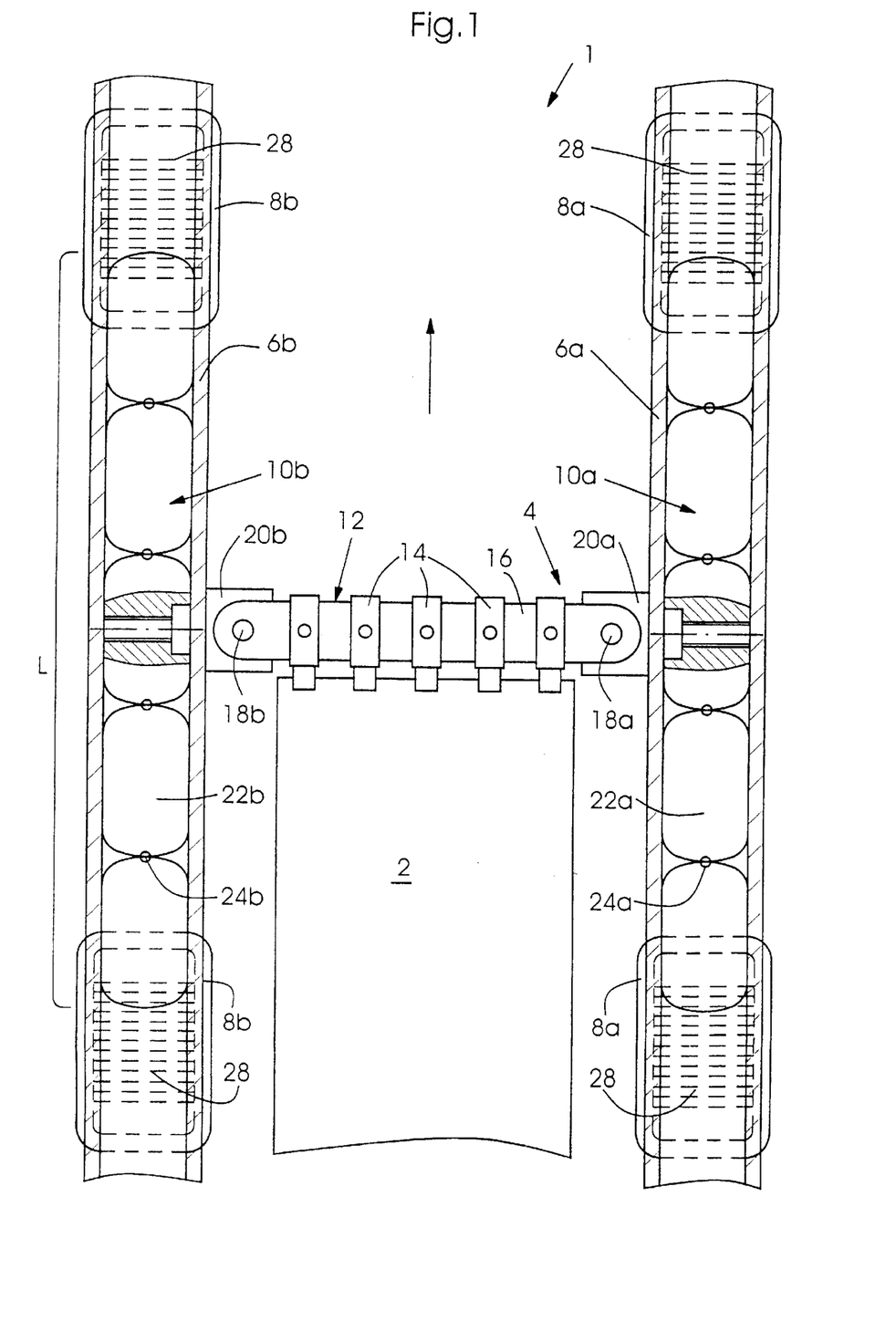
FIG. 1 is a diagrammatic top plan view of a sheet transport system according to the invention having a gripper bar, for example, installed between printing units, or in a delivery region of a printing press.
Figure 4:
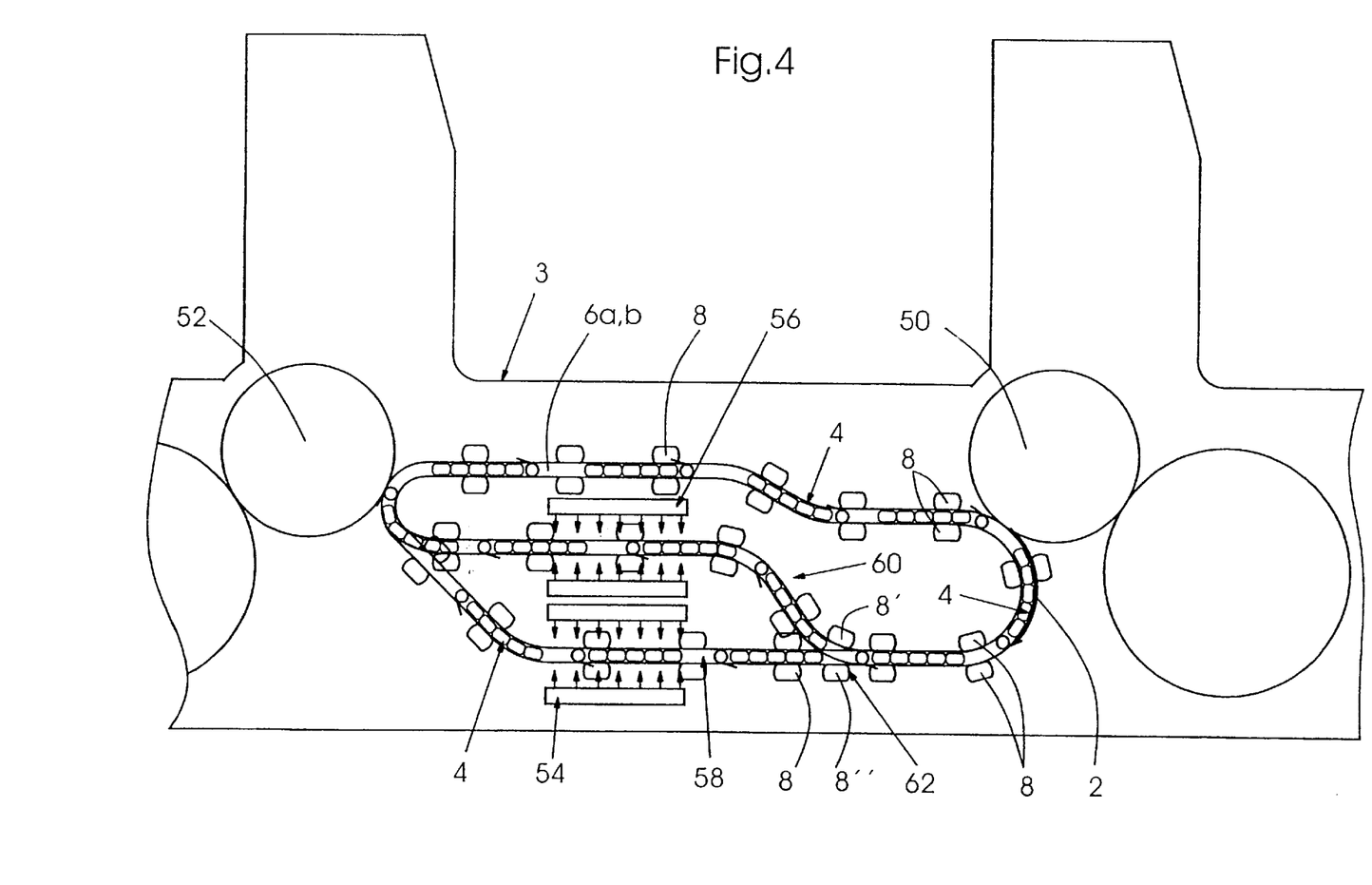
FIG. 4 is a diagrammatic side elevational view of two printing units of a sheet-fed rotary printing press, between which there is arranged a sheet transport system according to the invention having a multiplicity of revolving sheet transport devices and a plurality of web paths, as well as dryer devices assigned to the web paths.

Referring now to the drawings and, first, particularly to FIG. 1 thereof, there is shown therein a sheet transport system 1 according to the invention for transporting a sheet 2 in a printing press 3, in particular a sheet-fed rotary printing press, such as is shown in FIG. 4, for example, the sheet transport system 1 including a sheet transport device 4, first and second guide rails 6a and 6b extending substantially parallel to one another, and drive stations 8a and 8b which are respectively arranged at a distance D from one another along the respective guide rails 6a and 6b.

The novel sheet transport device 4 of the sheet transport system 1 further has a first propulsive drive element 10a guided in the first guide rail 6a, and a second propulsive drive element 10b guided in the second rail 6b, as well as a sheet holder 12 which connects the two propulsive drive elements 10a and 10b to one another and extends substantially over the width of the printing press and the non-illustrated printing unit cylinder, respectively. The sheet holder 12 may be formed, for example, by grippers 14 which are usually installed in sheet-fed rotary printing presses, for example tongs-type grippers, which are fixed to a cross member or traverse 16. In the same manner, however, the holder 12 may also be formed by suckers or suction grippers fixed to the cross member 16, for example the suckers 84 shown in FIG. 6, such as are known, for example, from the feeder region of sheet-fed printing presses.

In a preferred embodiment of the invention, the first and the second propulsive drive elements are formed by link chains shown in FIG. 1 and have at least two, but preferably five or more, individual elements 22a and 22b. The individual elements 22a and 22b are formed of magnetizable material and may be constructed as permanent magnets with N and S poles of, for example, samarium cobalt, neodymium iron boron or an otherwise known permanent magnetic material having an energy density that is as great as possible. Furthermore, it is possible to produce the individual elements 22a and 22b solely from a ferromagnetic material, for example soft iron, the linear drive operating in accordance with the reluctance principle known in the state of the art.

Figure 2:
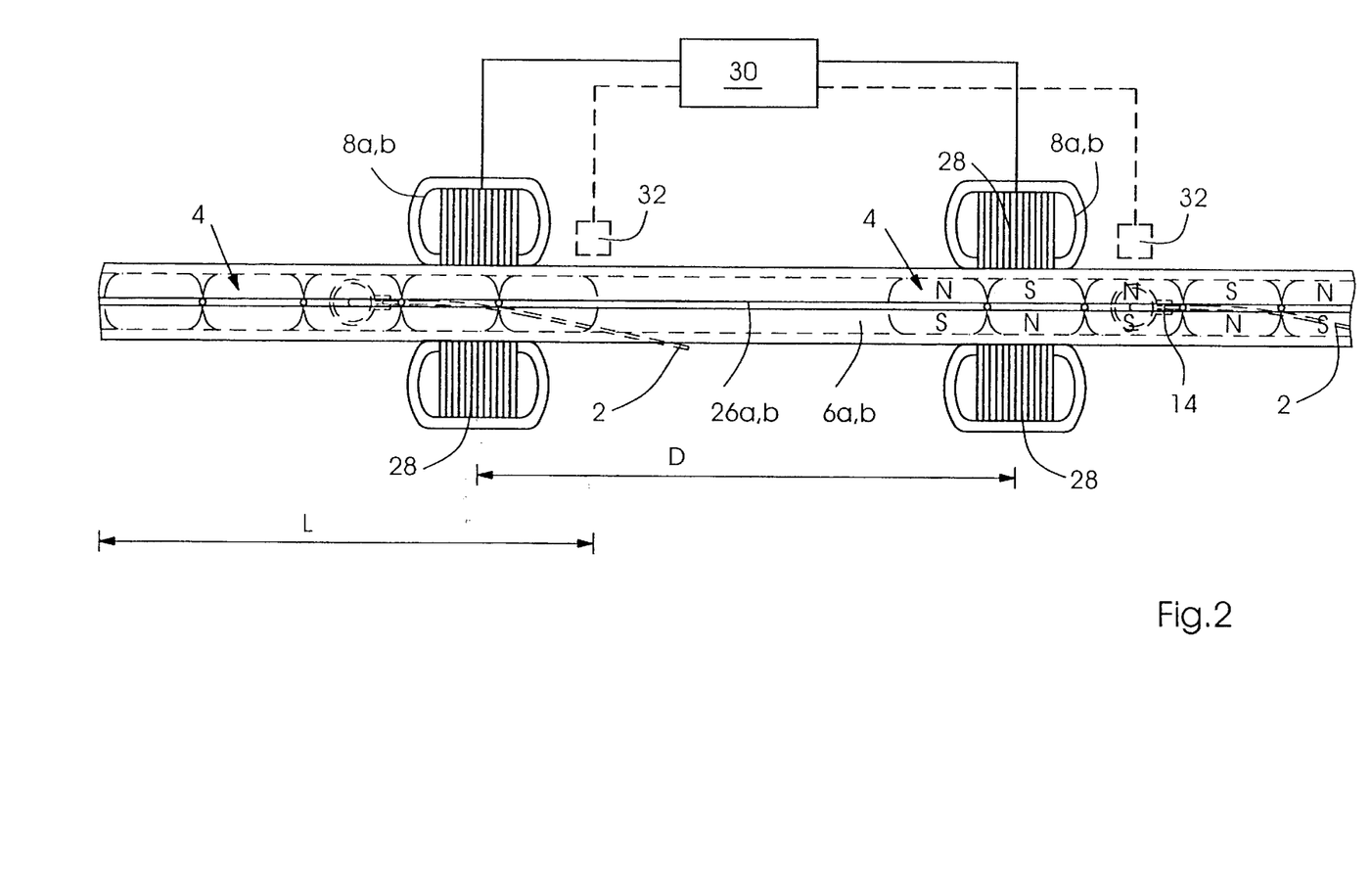
FIG. 2 is a schematic and diagrammatic reduced side elevational view of the sheet transport system of FIG. 1.

The individual elements 22a and 22b of the propulsive drive elements 10a and 10b are movably connected to one another via articulations or joints 24a and 24b. The joints 24a and 24b may be constructed, for example, as conventional ball-and-socket joints or as simple belts connecting two successive individual elements 22a and 22b to one another, for example belts formed of plastic or rubber material. The individual elements 22a and 22b have a preferably circular cross section and are guided free of play in the first and second guide rails 6a and 6b. Formed on a respective one of the individual elements 22a and 22b of the first and second propulsive drive elements 10a and 10b, the one individual element being preferably arranged in the center of the propulsive drive elements 10a and 10b, are mutually opposing projections 20a and 20b, to which the cross member 16 is fixed. As shown in FIG. 1, the cross member 16 is preferably fastened to the projections 20a and 20b by articulations or joints 18a and 18b, so that an oblique register correction of the transported sheet 2 can be performed by changing the relative position of the first and second propulsive drive elements 10a and 10b. The guide rails 6a and 6b have a cross-sectional shape that is adapted to or matches the cross-sectional shape of the individual elements 22a and 22b, the projections 20a and 20b, which are fixed to respective ones of the individual elements 22a and 22b of each of the propulsive drive elements 10a and 10b, extending to the outside through a respective longitudinal slot 26a, 26b which is formed in the guide rails 6a and 6b as illustrated in FIG. 2. In order to achieve better sliding guidance, it is possible for the bodies of the individual elements 22a and 22b and the inner faces of the guide rails 6a and 6b to be coated with a conventional antifriction coating, for example, a Teflon coating.

As illustrated in FIG. 2, the drive stations 8a and 8b are preferably arranged in pairs above and below the guide rails 6a and 6b, and contain conventional electromagnetic coils 28, which are supplied with power via a diagrammatically illustrated control and regulation device 30 and generate an electromagnetic traveling field to drive the sheet transport device 4 propulsively. In other words, the drive stations 8a and 8b with the coils 28 form the stator, and the propulsive drive elements 10a and 10b together with the individual elements 22a and 22b thereof made of magnetizable material form the rotor of an electric linear motor or linear drive. The drive stations 8a and 8b on the two guide rails 6a and 6b can be constructed in the most diverse manner. Thus, the coils 28 of the drive stations 8a and 8b may engage around the appertaining guide rails 6a and 6b in a U- or C-shape, for example, on the side thereof facing away from the respective slot 26a, 26b. In a similar manner, it is conceivable to construct each of the drive stations 8a and 8b as pairs of coils arranged only above and below the guide rails 6a and 6b, or to use coils with a known cross-flux or transverse-flux arrangement in the drive stations 8a and 8b. The choice of the coils depends upon the type of linear drive that is installed.

In the embodiment of the invention illustrated in FIGS. 1 and 2, the number of individual elements 22a and 22b of the first and the second propulsive drive elements 10a and 10b is preferably selected so that the length L of one of the propulsive drive elements 10a and 10b corresponds substantially to the distance D between two drive stations 8a and 8b on one of the guide rails 6a and 6b, so that the propulsive drive elements 10a and 10b are continuously in the active range of the traveling field due to the extension of the drive stations 8a and 8b. However, provision may be made in a similar manner for the distance D between two drive stations 8a and 8b of one guide rail 6a, 6b to be, at least in some sections, smaller than the length L of an associated propulsive drive element 10a, 10b.

Furthermore, the distance D between two drive stations 8a and 8b on one guide rail 6a, 6b may be, at least in some sections, greater than the length L of a propulsive drive element 10a, 10b, so that the propulsive drive element 10a, 10b is located completely outside the drive stations 8a and 8b and thus outside the active range of the electromagnetic traveling field. In this embodiment of the invention, the propulsive drive of the feed transport device according to the invention between two drive stations 8a and 8b of the first and second guide rails 6a, 6b occurs solely as a result of the movement energy which was fed to the sheet transport device or to the first and second propulsive drive elements 10a and 10b in one of the upline drive stations 8a and 8b. Thus, for example, in the region between two printing units, wherein precise positioning of the transport device 4 is not required, it may be advantageous to arrange the drive stations 8a and 8b at a distance of, for example, two to ten times the length L of a propulsive drive element 10a, 10b. Consequently, the number of drive stations 8a and 8b and, thus, the outlay on devices may be further reduced. In regions wherein the transport device 4 must be moved with high precision and accuracy, for example, in regions wherein the in-register transfer of a printed sheet to a downline printing unit occurs, it is, on the other hand, possible for a plurality of drive stations 8a and 8b to be arranged directly or at a short distance behind one another.

Figure 3:
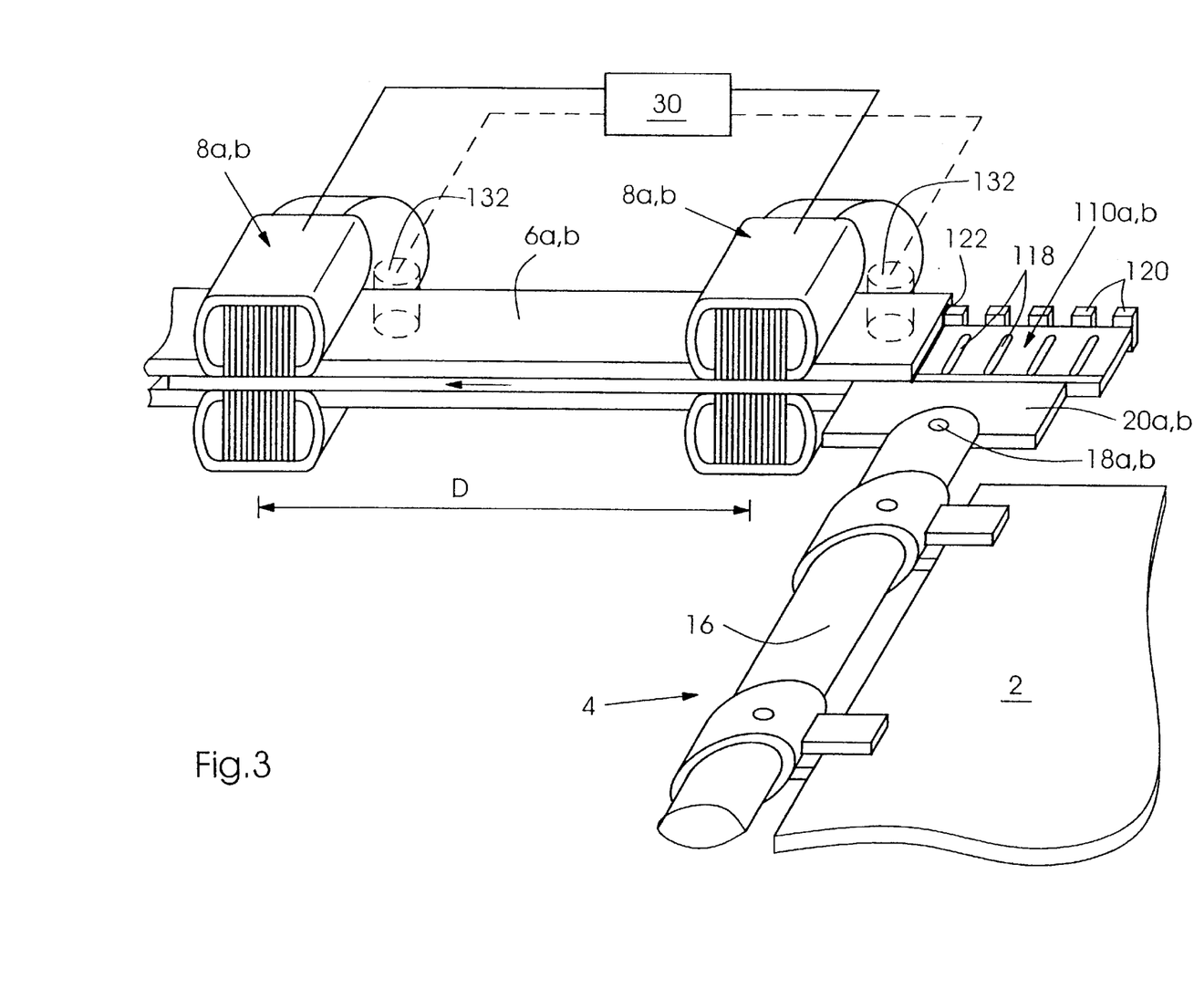
FIG. 3 is a fragmentary, schematic and diagrammatic front, side and top perspective view of another embodiment of the sheet transport system according to the invention having gripper devices, wherein propulsive drive elements are formed by flexible belts of magnetizable material.

In a further embodiment of the invention shown in FIG. 3, provision may furthermore be made for constructing the propulsive drive elements 10a and 10b of the embodiment shown in FIG. 1 and FIG. 2 as continuous belts provided with slots 118 or strips 110a and 110b of flexible magnetizable material, for example, soft iron or a similar material with ferromagnetic properties. In the same manner as in connection with the aforedescribed link-chain embodiment of the invention, it is possible for the propulsive drive elements 110a and 110b also to be constructed as permanent magnets or to contain permanent magnets which are formed, for example, of samarium cobalt, neodymium iron boron or some other permanent magnetic material, preferably one selected from the group of rare earths. For the improved guidance of the propulsive or forward drive elements, the strips 110a and 110b may have additional guide bodies 120, which are guided in an appertaining guide 122 of the guide rail 6a, 6b, which is preferably of flat construction. In the same manner as the propulsive drive elements 10a and 10b formed by link chains of the embodiment according to FIGS. 1 and 2, the strip-like propulsive drive elements 10a and 10b of the embodiment of the invention illustrated in FIG. 3 have, in the preferred embodiment, a length L which corresponds substantially to the distance D between two drive stations 8a and 8b on a guide rail 6a, 6b. However, as described hereinbefore, the distance D may also be less than or, in some sections, greater than the length L.

Finally, in a further embodiment of the invention, provision may also be made for using individual elements which are formed by closed conductor loops instead of the individual elements of magnetizable material. In this regard, the linear drive operates in accordance with the known asynchronous principle.

In the preferred embodiment of the invention, sensors 32, 132 are preferably arranged upstream of the drive stations 8a and 8b, as shown in FIGS. 1 to 3, the sensors being connected to the control and regulation device 30 and registering the speed and/or the exact position of the first and second propulsive drive elements 10a and 10b or 110a and 110b within the appertaining guide rails 6a and 6b. The control and regulation device 30 controls and regulates the electromagnetic traveling field of the drive stations 8a and 8b of the first and second guide rails 6a and 6b as a function of the speed and/or position registered by the sensors 32, 132, so that the transport device 4 performs a predefined propulsive or forward drive movement.

Although the control and regulation device 30 can jointly activate and regulate mutually opposite drive stations 8a and 8b of the first and second guide rails 6a and 6b pairwise, in the preferred embodiment of the invention, the control and regulation of the first drive stations 8a, is preferably performed independently of the control and regulation of the second drive stations 8b. In other words, in the preferred embodiment of the invention, the first and second propulsive drive elements 10a and 10b or 110a and 110b may be controlled and regulated independently of one another, which makes it possible, for example, to change the relative position of the first propulsive drive element 10a, 110a in relation to the second propulsive drive element 10b, 110b and, thereby, for example, to perform an oblique register correction of the sheet in the succeeding printing units. Furthermore, in this embodiment of the invention, it is possible to increase the speed of the first and second propulsive drive elements 10a, 10b, 110a, 110b by the same amount, in order thereby, for example, to perform simultaneously a speed and position correction of the sheet transport device 4 according to the invention.

According to the invention, the sheet transport device 4 shown in FIGS. 1 and 2 can be used in different sections of a printing press, without departing from the principle upon which it is based.

As FIG. 4 illustrates, it is possible, for example, to arrange the sheet transport system according to the invention between an upline and a downline printing unit of a sheet-fed rotary printing press, it being possible for the guide rails 6a and 6b to be constructed as closed endless rails. In this regard, a plurality of transport devices 4 revolve within the rails 6a and 6b, accept a sheet 2 from an impression cylinder 50 of the upline printing unit and transfer it to the gripper devices of an impression cylinder 52 of the downline printing unit. In this regard, provision may be made for dryer devices 54 and 56, for example, in the form of conventional IR dryers or hot-air dryers, to be provided above and below the guide rails 6a and 6b, these devices drying the upper side and, if necessary, the underside of a printed sheet 2. In accordance with a further embodiment of the invention, provision may be made for the speed of the sheet transport devices 4 to be reduced in the region of the dryer devices 54 and 56 by the control and regulation device 30, in order to prolong the time of passage through the dryer devices 54 and 56 and thereby to increase the drying time and thus the drying effect.

Furthermore, provision may be made for the first and second guide rails 6a and 6b to be divided up into two independent rail paths or web paths 58 and 60 running alongside one another, by which the speed of the sheet transport device 4 may be reduced once again by a factor of two in the region of the dryer devices 54 and 58. The rail paths 58 and 60 preferably run horizontally and parallel to one another, it being possible for the dryer devices 54 and 56 to be arranged above and below each path, as shown in FIG. 4. In order to feed the transport devices 4 alternately to the upper rail path 60 and to the lower rail path 58, a conventional diverter 62 is arranged upline of the rail paths 58 and 60, as viewed in the sheet transport direction.

The diverter 62 may be formed, for example, by two additional drive stations 8' and 8", which are arranged at the start of the respective rail path 58, 60 and to which current is applied alternately by the control and regulation device 30 in accordance with the web path to be followed, as a result of which the leading end of the propulsive or forward drive elements 10a, 10, 110a, 110b is appropriately drawn into one or the other rail path 58, 60 by the force components acting upon the propulsive or forward drive elements and directed perpendicularly to the propulsive or forward drive direction.

Figure 5:
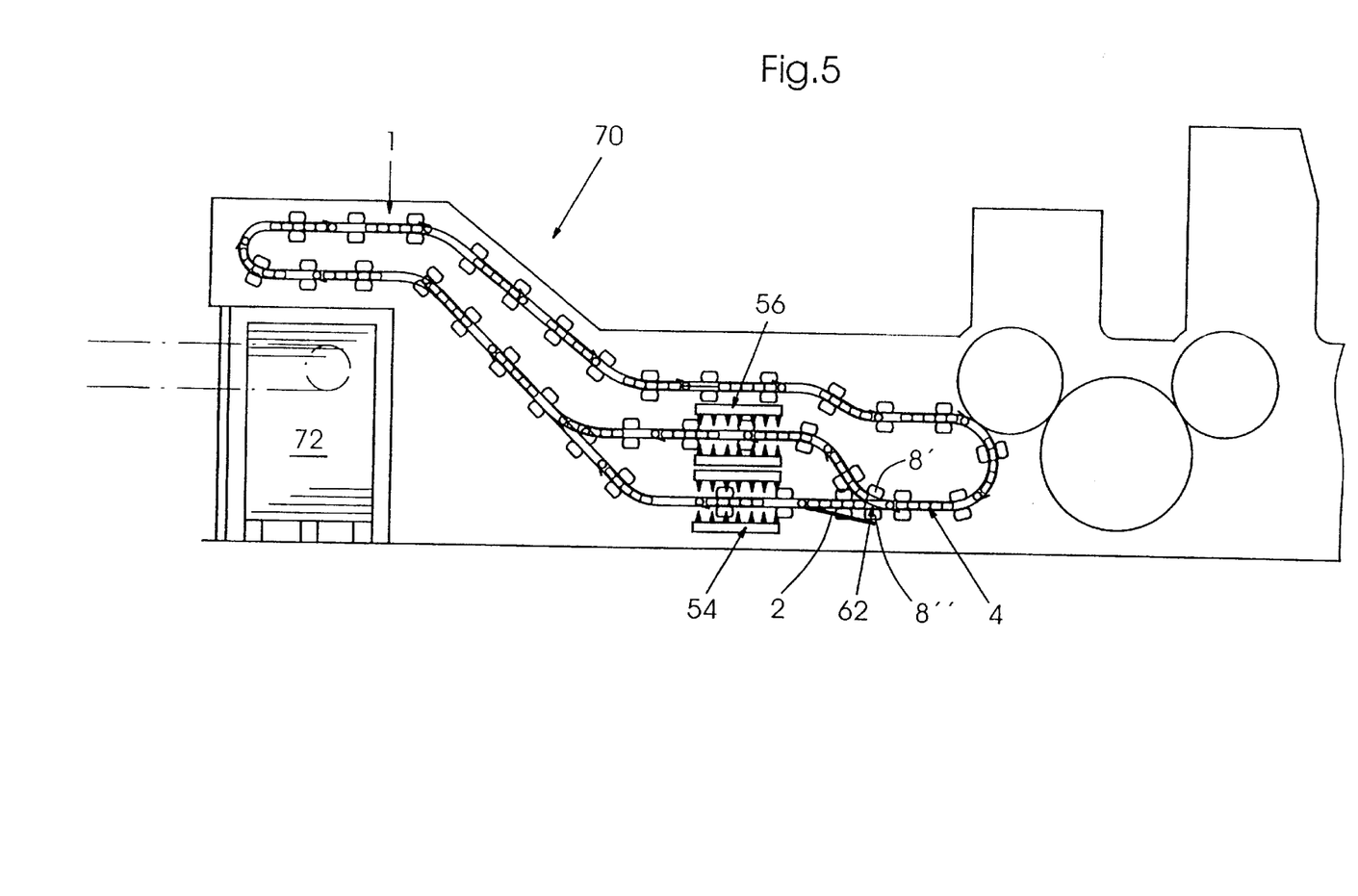
FIG. 5 is a view like that of FIG. 4, reduced in size and showing the sheet transport system arranged in the delivery region of the printing press together with dryers and a multiplicity of revolving sheet transport devices.

Furthermore, provision may be made for the sheet transport system 1 according to the invention to be installed in the region of a delivery 70 of a conventional sheet-fed rotary printing press, or to construct this sheet transport system as a delivery, as illustrated in FIG. 5. In this embodiment of the invention, which corresponds in substance to the embodiment of a sheet transport system according to the invention that was described in conjunction with FIG. 4 and is installed between two printing units, the printed sheets 2 are taken over from the last printing unit by the transport devices 4 and are deposited on a sheet pile 72 or a non-illustrated transport belt. In this regard, provision may advantageously be made for the control and regulation device to reduce the distance between two successive sheet transport devices 4 in the region of the pile 72 or transport belt so that the distance is less than the length of a sheet 2, and so that the printed sheets 2 are deposited as an imbricated formation. Consequently, the deposition speed of the sheets in the delivery 70 can advantageously be reduced further. Due to the deposition of the sheet as an imbricated formation, in particular in the case of further processing, for example, when rolling up the printed products to form conventional reels, a considerable reduction in the device outlay or expense results. Furthermore, when installing the sheet transport system 1 according to the invention in the delivery 70 of a sheet-fed rotary printing press, it may be advantageous if an additional rail path (not illustrated in FIG. 5), which can be activated via a higher-order diverter, is provided in the region of the delivery pile 72, this additional rail path being constructed in the same manner as the rail paths 48 and 60 illustrated in FIG. 4 and enabling the removal of proof sheets without additional, mechanically complex proof-sheet removal devices.

Figure 6:
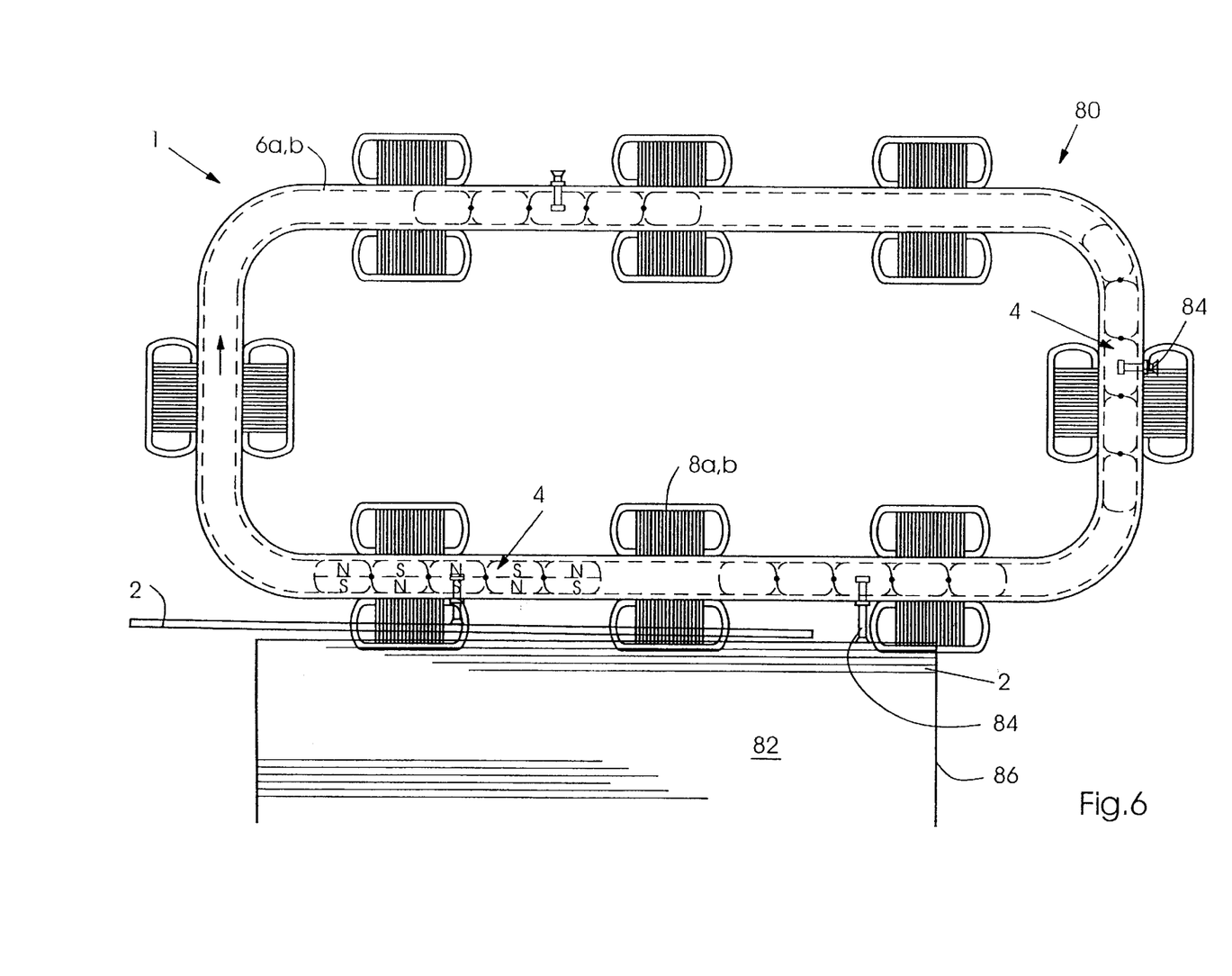
FIG. 6 is a diagrammatic side elevational view of a sheet transport system according to the invention, having suction devices and being arranged in a feeder region of a printing press.

A further possible application of a sheet transport system 1 according to the invention is the arrangement thereof in a feeder 80 of a sheet-fed rotary printing press. In the embodiment of the invention shown in FIG. 6, the guide rails 6a and 6b are preferably constructed as endless guide rails, which run above the pile 82 of sheets to be printed. The holder 12 may be constructed as conventional lifting suckers 84, which are fastened, for example, to the FIG. 1 cross member 16 of the sheet transport device 4, and to which suction air is applied via non-illustrated suction-air feeding devices. As illustrated in FIG. 6, it is possible for a plurality of sheet-transport devices 4 to revolve independently of one another within the endless guide rails 6a and 6b, the control and regulation device 30 controlling and regulating the drive stations 8a and 8b so that the speed of the sheet transport devices 4 is sharply reduced, and preferably even brought to a standstill, when the trailing edge 86 of the sheet pile 82 is reached, so that when the suckers 84 are extended, or when the suction-air supply is switched on, there is no relative speed or virtually no relative speed between the sheet 2 to be picked up by suction and the sucker 84. After the sheet 2 to be transported has been picked up or tightly held by the sucker 84 and lifted from the pile 82, the speed of the transport device 4 according to the invention is increased until the transport device and the sheet 2 transported therewith reach the imbrication speed required for imbricated feeding of the sheets. The acceleration of the transport device 4 according to the invention preferably occurs uniformly, in this regard, and is of such magnitude that, when the suction-air supply is cut off in FIG. 6, the transported sheet 2 is certain to have the required imbrication speed. After the suction-air supply has been cut off, the control and regulation device 30 preferably controls the movement of the inventive sheet transport device 4 so that the speed thereof is initially increased and then, shortly before the trailing edge 86 of the sheet pile 82 is reached, is reduced again in the aforedescribed manner.

In all of the aforedescribed possible uses or applications of the sheet transport system 1 according to the invention, the possibility exists of transporting the sheets exclusively by a single sheet transport device 4. Provision is advantageously made, however, for installing or using a relatively large number of sheet transport devices 4 according to the invention within the guide rails 6a and 6b, which results in a more uniform movement of the devices 4.

Although the sheet transport system 1 according to the invention has been described hereinbefore by using it, for example, in a sheet-fed rotary printing press 3, it may also be used in an identical manner in a conventional web-fed rotary printing press, for example as a web infeed device. In this regard, it is not absolutely necessary to use two mutually opposite guide rails, but instead it is quite sufficient to arrange only one guide rail, with a propulsive or forward drive element arranged therein, along the web threading path, and to fasten the leading end of the paper web to be infed, for example, to the projection 20a, 20b. This does not depart from the basic principle upon which the invention is based.

Finally, it is conceivable to use the propulsive or forward drive elements of the aforementioned transport system for driving the transport grippers in conventional further processing plants for printed products, such as binding plants and folding plants, for example. In this regard, the transport grippers for holding the printed products can, for example, respectively be fastened individually to the projections 20a and 20b of the propulsively or forward drive elements 10a and 10b or 110a and 110b, so that the movement of each transport gripper can be controlled and regulated individually by the control device 30. Furthermore, it may be advantageous, in this case, as in the case of the aforedescribed web infeed device, to use only a single guide rail 6a, 6b instead of two mutually opposite guide rails.

We claim:

1. A sheet transport system for a rotary printing press, including a sheet transport device having a sheet holder, and a first and a second propulsive drive element for propulsively driving the sheet transport device guidingly in a first and a second guide rail, respectively, the second guide rail extending substantially parallel to the first guide rail, the first and the second propulsive drive elements forming rotors of an electric linear drive, the first and the second guide rails having a plurality of drive stations disposed thereon and forming a stator of the linear drive, and a control device assigned to the drive stations for controlling and regulating movement of the first and the second propulsive drive elements, each of the first and second propulsive drive elements comprising a structure formed of magnetizable material, at least part of which is movable relative to another part thereof, and the drive stations being spaced from one another, at least in some sections of the sheet transport device, a distance which is at most equal to the length of the propulsive drive elements.

2. The sheet transport system according to claim 1, wherein said structure of the propulsive drive elements, respectively, is a link chain formed of said magnetizable material and including at least two individual elements articulatedly connected to one another.

3. The sheet transport system according to claim 1, wherein said structure of the propulsive drive elements, respectively, is a flexible belt formed of said magnetizable material.

4. The sheet transport system according to claim 3, wherein said flexible belt is formed at least partly with ferromagnetic material, and slots are provided in the belt.

5. The sheet transport system according to claim 1, wherein said magnetizable material is formed by permanent magnets.

6. The sheet transport system according to claim 1, wherein said magnetizable material contains permanent magnets.

7. The sheet transport system according to claim 1, wherein said magnetizable material is a ferromagnetic material.

8. The sheet transport system according to claim 1, in combination with a printing press, wherein the sheet transport device is arranged between an upline and a downline printing unit of the printing press, and the sheet holder is formed by gripper devices for accepting a sheet from gripper devices of the upline printing unit and transferring the sheet to gripper devices of the downline printing unit.

9. The sheet transport system according to claim 8, including a plurality of sheet transport devices simultaneously revolvable together within the guide rails.

10. The sheet transport system according to claim 9, including at least one dryer disposed in vicinity of the guide rails, so that the printed sheets are guidable past said dryer.

11. The sheet transport system according to claim 10, wherein the first and second guide rails, in the region of the at least one dryer, are divided into two rail paths running above one another wherein the speed of the sheet transport devices is reduced, and including a diverter provided thereat for feeding successive sheet transport devices alternately to said two rail paths.

12. The sheet transport system according to claim 11, wherein said rail paths extend substantially horizontally at a spaced distance from one another, and wherein a respective one of said dryers is arranged above and below each of said rail paths so that the upper side and the underside of each sheet can be dried simultaneously.

13. The sheet transport system according to claim 1, wherein the sheet transport device is arranged in a delivery region of a printing press, and the sheet holder is formed by gripper devices for accepting a sheet from an upline printing unit of the printing press and depositing the sheet on a pile.

14. The sheet transport system according to claim 13, including a plurality of sheet transport devices simultaneously revolvable together within the guide rails.

15. The sheet transport system according to claim 14, wherein the control device serves for controlling the movement of the propulsive drive elements of the sheet transport devices in the region of the sheet pile so that distances between two successive sheet transport devices are less than the length of a transported sheet, and so that an imbricated formation of the deposited sheets is formed.

16. The sheet transport system according to claim 1, including a cross member extending from the first propulsive drive element to the second propulsive drive element, the sheet holder being formed by gripper devices fixed to said cross member.

17. The sheet transport system according to claim 16, wherein said cross member is connected articulatedly to the first and the second propulsive drive elements.

18. The sheet transport system according to claim 1, wherein the sheet transport device is arranged in a feeder region of a printing press, and the sheet holder of the sheet transport device is formed by suction devices for removing from a sheet pile the sheets to be transported, and for feeding the sheets to a first printing unit of the printing press.

19. The sheet transport system according to claim 18, wherein the control device is actuatable for changing the speed of the first and the second propulsive drive elements during one revolution of the sheet transport device so that the speed of the sheet transport device is reduced when a sheet is being removed by suction from the sheet pile, and is subsequently increased to a predefined value.

20. The sheet transport system according to claim 19, wherein, after the sheet has been picked up by suction and before the sheet has been released, the speed of the sheet transport device is increasable to a speed which corresponds substantially to the speed of an imbricated formation formed by the sheets.

21. The sheet transport system according to claim 18, wherein said suction devices are fixed to a cross member extending from the first propulsive drive element to the second propulsive drive element.

22. The sheet transport system according to claim 21, wherein said cross member is connected articulatedly to the first and the second propulsive drive elements.

23. The sheet transport system according to claim 18, including a plurality of sheet transport devices simultaneously revolvable together within the guide rails.

24. The sheet transport system according to claim 1, wherein the control device is actuatable for controlling and regulating the movement of the first and second propulsive drive elements independently of one another, and for changing the relative position between the first propulsive drive element and the second propulsive drive element, in order to adjust the oblique register of a transported sheet.

25. The sheet transport system according to claim 1, wherein the distance between two drive stations over a subsection of the guide rails is greater than the length of the propulsive drive elements to such an extent that the movement of the propulsive drive elements in this subsection occurs substantially without any drive, and solely by virtue of movement energy of the propulsive drive elements which has been fed to the propulsive drive elements in an upline drive station.

* * * * *